(12) United States Patent
Mongan et al.

(10) Patent No.: US 9,720,442 B2
(45) Date of Patent: Aug. 1, 2017

(54) FLASH INSERT FOR MOBILE PHONE CASE

(75) Inventors: Ryan Hill Mongan, Orange, CA (US); Bryan Lee Hynecek, Redwood City, CA (US); Jarret Weis, San Francisco, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 654 days.

(21) Appl. No.: 12/890,603

(22) Filed: Sep. 25, 2010

(65) Prior Publication Data
US 2012/0019920 A1 Jan. 26, 2012

Related U.S. Application Data

(60) Provisional application No. 61/400,361, filed on Jul. 27, 2010, provisional application No. 61/400,002, filed on Jul. 20, 2010.

(51) Int. Cl.
| | | |
|---|---|---|
| *G02B 27/00* | (2006.01) | |
| *G06F 1/16* | (2006.01) | |
| *F21V 8/00* | (2006.01) | |
| *G02B 19/00* | (2006.01) | |

(52) U.S. Cl.
CPC ......... *G06F 1/1628* (2013.01); *G02B 6/0035* (2013.01); *G02B 19/0004* (2013.01); *G02B 19/0047* (2013.01); *G02B 27/00* (2013.01); *G02B 6/0045* (2013.01); *G02B 6/0088* (2013.01); *G03B 2215/0592* (2013.01); *G06F 2200/1633* (2013.01)

(58) Field of Classification Search
CPC  G02B 27/00; G02B 27/0018; G02B 27/0068; G02B 27/024; G02B 27/026; G02B 27/028; G02B 5/00; G02B 5/003; G06F 1/1628

USPC .................................................. 359/601–614
See application file for complete search history.

(56) References Cited

U.S. PATENT DOCUMENTS

| | | | | |
|---|---|---|---|---|
| 4,901,097 | A * | 2/1990 | Vandemoere et al. | 396/6 |
| 5,237,453 | A * | 8/1993 | Jones | 359/601 |
| 5,907,721 | A * | 5/1999 | Schelling et al. | 396/27 |
| 7,372,641 | B2 * | 5/2008 | Maschek | 359/739 |
| 7,612,997 | B1 * | 11/2009 | Diebel et al. | 361/679.56 |
| 8,442,604 | B1 | 5/2013 | Diebel | |
| 8,509,864 | B1 * | 8/2013 | Diebel | G03B 17/02 361/679.32 |
| 2005/0107117 | A1 * | 5/2005 | Makino | 455/556.1 |
| 2005/0107118 | A1 * | 5/2005 | Makino | 455/556.1 |

(Continued)

FOREIGN PATENT DOCUMENTS

JP U3163088 * 9/2010 ............ 359/614

OTHER PUBLICATIONS

English translation of the "Detailed Desciption" section of the Japanese reference No. U3163088.*

*Primary Examiner* — Thong Nguyen
(74) *Attorney, Agent, or Firm* — Haug Partners LLP (57) ABSTRACT

A case, for an electronic device such as a mobile phone, containing an insert located near a camera, still image recorder, or video recorder and a flash of the device is disclosed. The placement, material, color and properties of the insert helps reduce and/or eliminate problems associated with the case affecting the resultant flash/light from the camera, causing and adding erroneous colors, effects, and information on the resulting pictures, images, sensors, or videos.

35 Claims, 6 Drawing Sheets

(56) References Cited

U.S. PATENT DOCUMENTS

| | | | |
|---|---|---|---|
| 2008/0205873 A1* | 8/2008 | Park | 396/200 |
| 2009/0161215 A1* | 6/2009 | Chan | 359/511 |
| 2011/0315579 A1* | 12/2011 | Mase | 206/316.2 |
| 2012/0018323 A1* | 1/2012 | Johnson | H04B 1/3888 206/320 |
| 2012/0070140 A1* | 3/2012 | Chow | H04M 1/0264 396/176 |

* cited by examiner

Prior Art

FLASH INSERT FOR MOBILE PHONE CASE

RELATED APPLICATIONS

The current application is related to (continuation of) a prior provisional application Ser. No. 61/400,361, filed on Jul. 27, 2010, with the same inventors, assignee, and title. It is also related to another provisional application Ser. No. 61/400,002, filed on Jul. 20, 2010, with the same assignee, titled "Flash lens for mobile phone case", taking benefits of all teachings and earlier filing date of that application.

BACKGROUND OF THE INVENTION

One embodiment of the current invention describes a casing (or case, sleeve, protection, jacket, folder, or container) for a mobile device (or gadget), such as a cell phone, GPS unit, MP3 player, camera, or laptop computer. As LED, battery and phone technologies become more advanced, mobile phones, which have had cameras on them for some time, are now starting to incorporate flashes, as well. Two models of phones that utilized these flashes in 2009 were the Palm Pre and the Motorola Droid. In 2010, Google introduced the Nexus One with a flash and Apple updated its iPhone to the iPhone 4 to include a flash.

Figure 1:
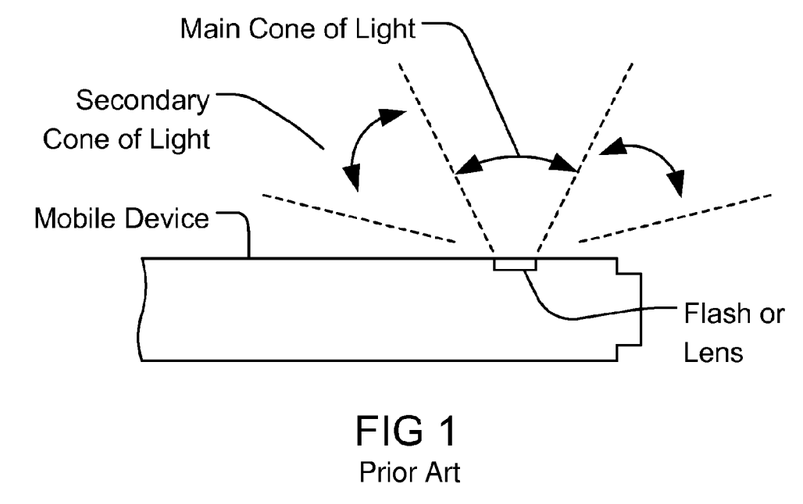
FIG. 1 shows a cross-section taken through the flash or lens of a camera unit, on another gadget or mobile device, with main cone of light and secondary cone of light.

Cases are often used with these devices to protect them from shock and cosmetic scratching. However, a problem exists with the flash, when the device is used with a case. The flashes have a very wide angle of light so that everything within the view of the camera is illuminated (FIG. 1). The intensity of the light decreases from the main cone of light as the angle increases off-the-center of the field of view, into the secondary cone of light. This is a gradual decreasing of intensity from the main cone of light to the secondary cone of light and through it.

The distinction between the main and secondary cones of light can be roughly marked or distinguished using the following rule: The secondary cone (boundary) is defined as the space or area that gets altered by a case, in terms of erroneous color and image, if one is not using the current invention.

Figure 2:
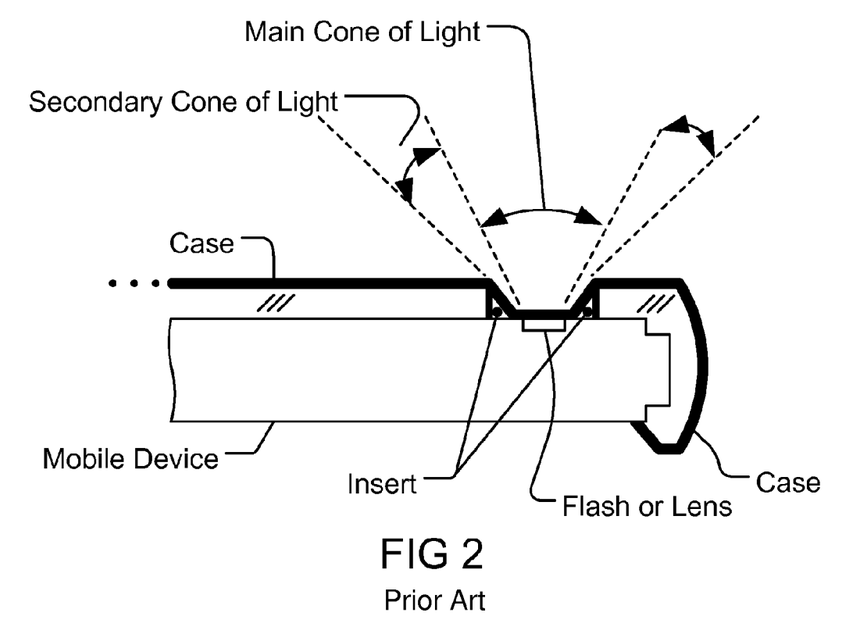
FIG. 2 shows a cross-section taken through the flash or lens of a camera unit, on another gadget or mobile device, with main cone of light and secondary cone of light, having the jacket, case, or cover, for protection.
Figure 3:
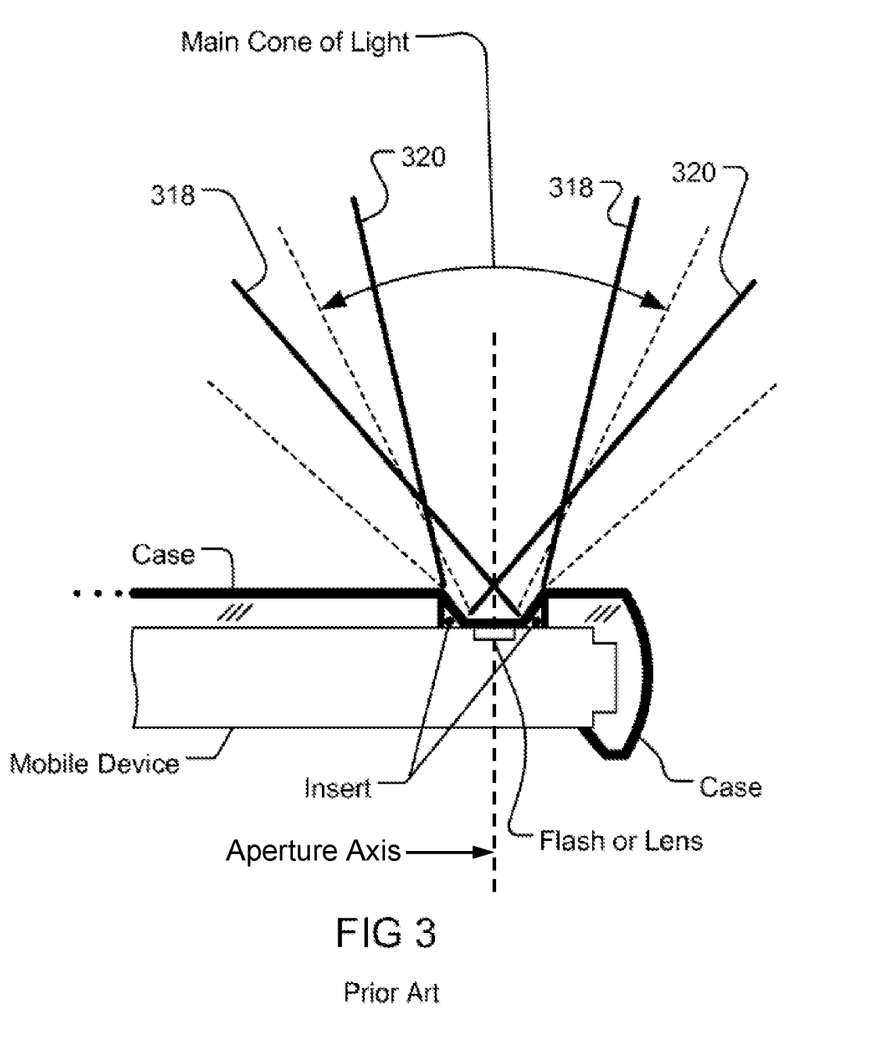
FIG. 3 shows a cross-section taken through the flash or lens of a camera unit, on another gadget or mobile device, with main cone of light and secondary cone of light, having the jacket, case, or cover.

When a case, skin, shield or cover is applied to the device for protection, styling, or other user-desired purposes, this case needs to have a cut out for the camera and its flash. Even with a substantial cut out in the case, the case often interferes with the secondary cone of light (FIG. 2). This interference has a negative impact, if the case is constructed in any color other than a neutral shade (i.e. constructed in any color other than a shade of gray ranging from white to black). In a case with a non-neutral color surrounding the flash, the reflected light that bounces off the case and reaches the subject or surrounding area is imparted with a component of the color of the case (FIG. 3, items 318 and 320). For example, a pink case will yield light that has a pink component. This pink light will drench the subject, and the resulting photo will have a pink tone.

FIG. 1 shows the arrangement of flash or lens for a camera unit, on another gadget or mobile device, with main cone of light and secondary cone of light. FIG. 2 shows the arrangement of flash or lens for a camera unit, on another gadget or mobile device, with main cone of light and secondary cone of light, having the jacket, case, or cover, for protection.

FIG. 3 shows the arrangement of flash or lens for a camera unit, on another gadget or mobile device, with main cone of light and secondary cone of light, having the jacket, case, or cover. The light reflecting from a colored case imparts a component of that color upon the subject, after the flash, or has that color component imparted back on the picture, film, sensors, or image, when the light comes into the lens, from one or more reflections, refractions, or diffractions, adding or subtracting colors or components of spectrum (e.g. items 318 and 320 in FIG. 3). Even though the interference of the case and the light takes place in the secondary cone of light, due to reflections, the color is imparted not only into the secondary cone of light, but also into the main cone of light, where the primary subject matter resides. This phenomenon also applies to the flash for a camera or image/video recorder.

However, with this invention and its embodiments described here, we are solving this problem and dramatically reducing this effect.

SUMMARY OF THE INVENTION

In one embodiment, we describe a method and apparatus for solving the problem associated with the cover affecting the flash/light from a cell phone camera (for example), causing and adding erroneous colors and information on the resulting pictures. With this invention and its embodiments described here, we are solving this problem and dramatically reducing this effect.

The invention can be applied to lens, flash, or other apertures, for camera, video, phone, or other gadgets, for any kind of image, multimedia, or video, on any digital or analog media, for transmission, storage, recording, or any other purposes.

DETAILED DESCRIPTION OF THE PREFERRED EMBODIMENTS

Figure 4:
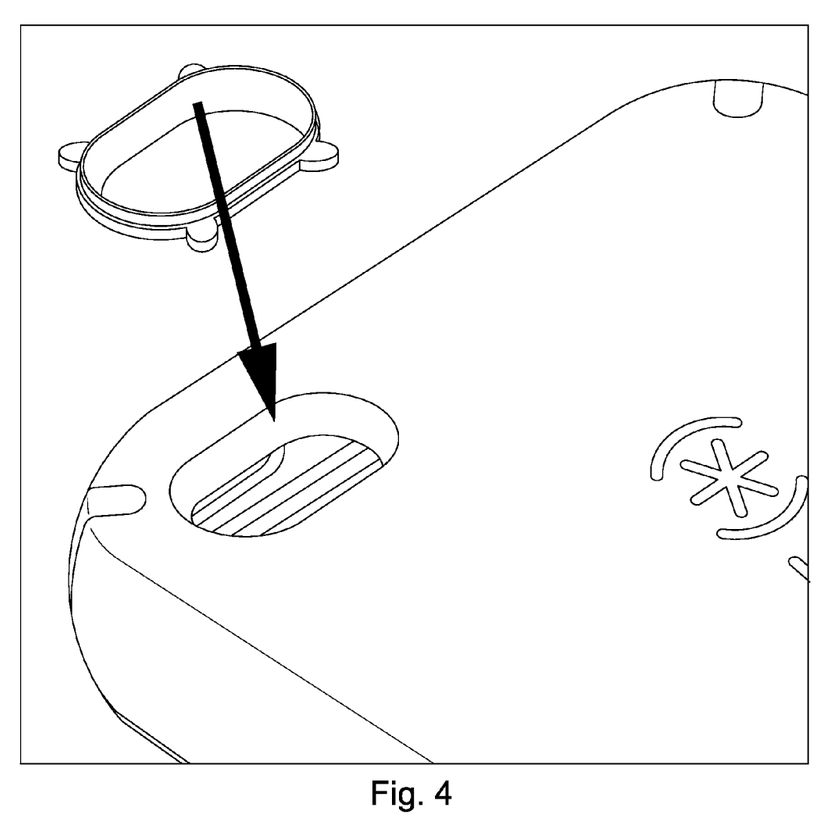
FIG. 4 shows an insert added to remove problem mentioned on FIG. 3.

The invention described in FIG. 4 addresses the issue of the light color effects mentioned above. An insert of a neutral color is incorporated into a case. It is shown in a non-neutral color in this case, for reasons of visual clarity. This allows the bulk of the case to be any color, or reflectivity the user desires, while not imparting that color upon the subject of the photo. (FIG. 4 shows an insert added to remove problem mentioned on FIG. 3.)

This insert could be mechanically, thermally, chemically, inset-molded, co-molded, or otherwise integrated or attached into the surrounding case. The insert could also be a film or coating, and be painted, dyed, silkscreened, sublimated, hydropainted, or otherwise coated onto the surface of the case. In one of the embodiments, a neutral color insert or coating is used.

In one of the embodiments, a non-neutral color of the insert could be utilized, if the surface was absorptive in nature. In this case, the light would be absorbed into the material, and not reflected out upon the subject. In addition, the surface could be mirrored or reflective in nature, as long as this reflective surface did not have a non-neutral tint (in another embodiment).

Figure 5:
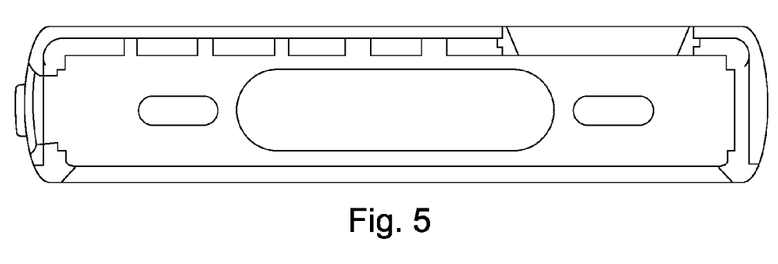
FIG. 5 is a cross-section of the case and insert, showing the integration of the part into the case.
Figure 6A:
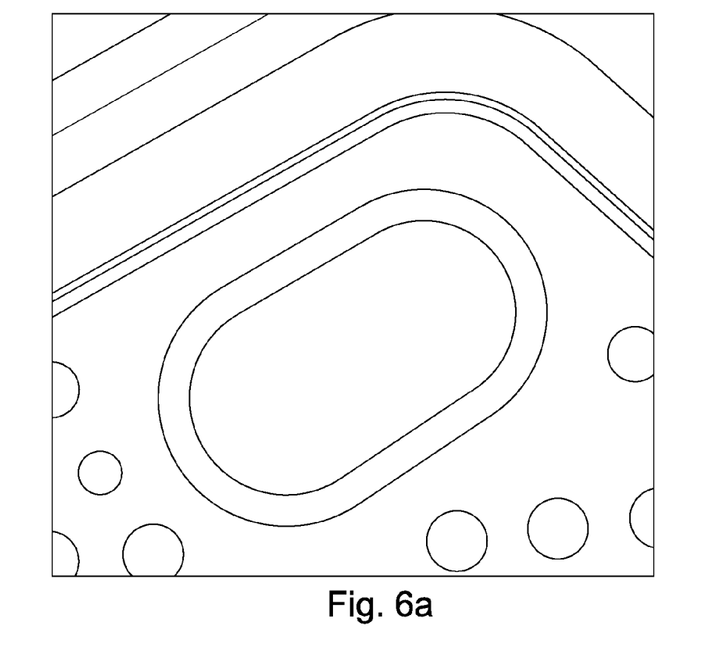
FIGS. 6a-6d demonstrate one embodiment of the present invention integrated into the case of a cell phone (in this example, for an Apple iPhone 4).
Figure 6B:
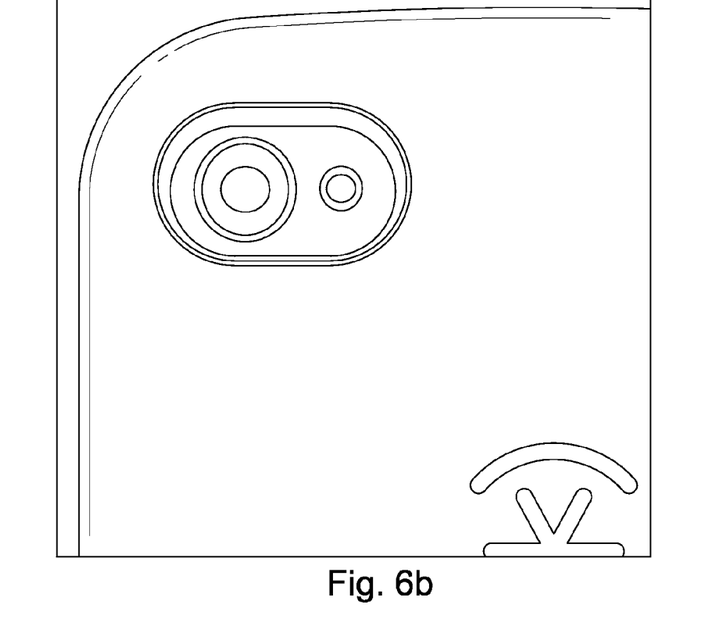
Figure 6C:
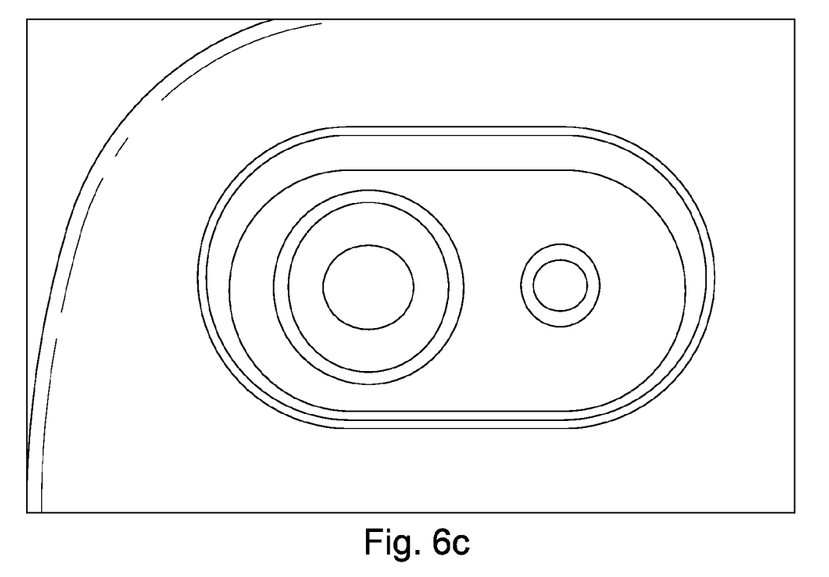
Figure 6D:
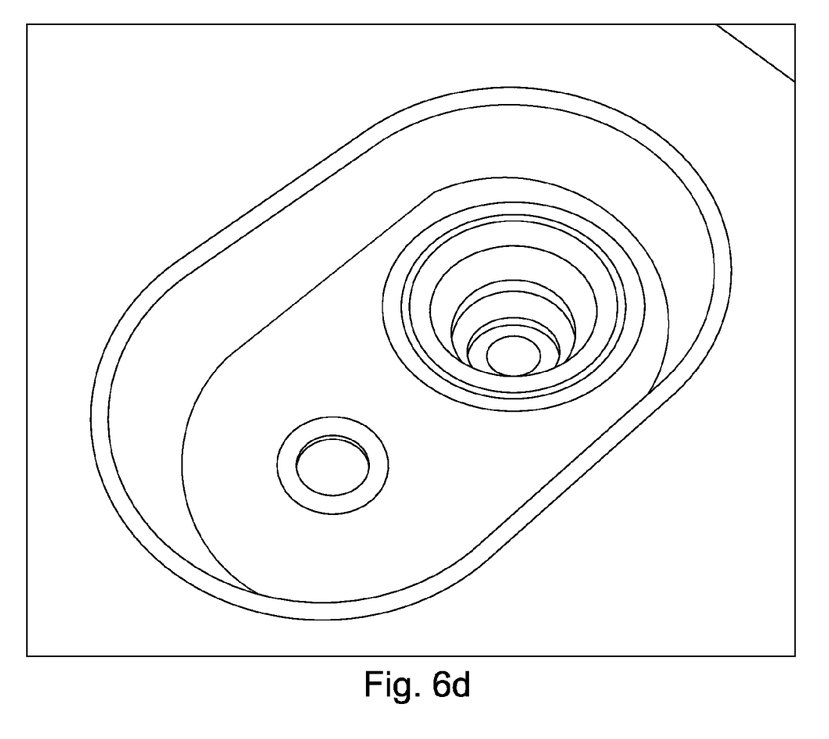

FIG. 5 is a cross-section of the case and insert, showing the integration of the part into the case. In one embodiment, we use black or shades of gray for the neutral colors. In one embodiment, we use rough surface for better absorption of light, and no/low reflection. In one embodiment, we use multiple layers or surfaces around the lens, light, and flash, to absorb more light, for different frequencies, wavelengths, or regions of visible spectrum of light. In one embodiment, we use sloped inward, concave, or convex surfaces, to redirect the reflection of light outside the capture area/scope of the lens.

FIGS. 6a-6d demonstrate one embodiment of the present invention integrated into the case of a cell phone (in this example, for an Apple iPhone 4). In different embodiments, the insert covers lens, flash, or both, with one insert or multiple inserts, which requires one or more openings on the gadget or cover/case.

Figure 7:
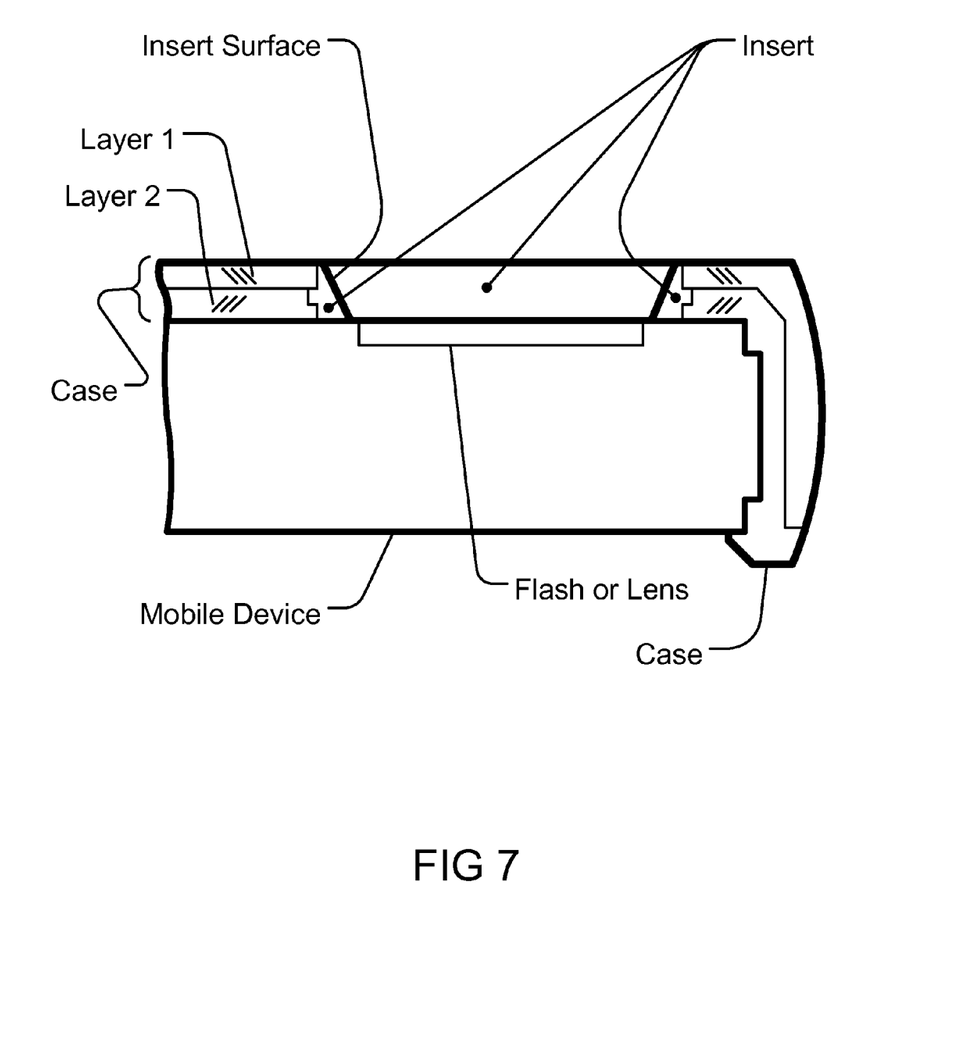
FIG. 7 shows a cross section of the case or sleeve around the device or gadget taken through the flash or lens of the device, with proper surfaces for controlling/reducing the light reflection.

FIG. 7 shows an arrangement of the case or sleeve around the device or gadget, with proper surfaces for controlling/reducing the light reflection. In this case, one can use neutral colors (e.g. a tone of gray between white and black), or one can use a non-reflecting, absorptive surface. Note that the insert can be an absorbing surface, or neutral color, or non-reflecting (or low reflecting) surface, or a combination of those. Note also that it could be a non-neutral reflecting surface as long as the color added to the insert was very slight and the insert was predominantly neutral in color. The insert can be integrated as part of a case or jacket. Or, it can be another piece, added to case or jacket, as a separate piece. The case may have one or more layers (e.g. layers 1 and 2 in FIG. 7). The insert may have a notch or lip(s), to attach to the case or jacket, as shown in FIG. 7. Or, one can use glue, screw, small bar, or spring, to attach the insert to the case or casing.

The material used for case or insert or lens jacket or flash jacket can be selected from the following list (or their combinations): plastic, elastic material, rubber, any artificial material, rigid, soft, flexible, wood, glass, mirror, smooth, rough, coarse material or surface, metal, alloy, nylon, cotton, wool, fabric, natural material, convex, concave, flat surface, quartz, transparent, translucent, opaque material, crystal, lens, uniform, non-uniform surface, reflective surface, or absorptive surface.

Any variations of the above teaching are also intended to be covered by this patent application.

The invention claimed is:

1. A case for a mobile device, the mobile device including a camera, said case comprising:
   a jacket which is separate and removable from the mobile device, and which is configured to cover a portion of an outer surface of said mobile device when the mobile device is arranged in the case;
   an opening in the jacket; and
   an insert which is arranged in the opening and comprises:
      an aperture;
      an aperture-facing surface which faces the aperture;
   wherein the insert is configured to surround both a flash unit and a camera lens, the camera lens spaced separate from the flash unit, of the mobile device so that the flash unit and the camera lens are both exposed by the aperture of said insert when the mobile device is arranged in the case; and
   wherein the aperture-facing surface of said insert is adapted to reduce reflection of light or increase absorption of light emitted by the flash unit of said mobile device when the mobile device is arranged in the case.

2. The case for a mobile device as recited in claim 1; wherein said insert is a coating, film, or paint layer or layers.

3. The case for a mobile device as recited in claim 1; wherein the jacket comprises at least two layers.

4. The case for a mobile device as recited in claim 1; wherein a portion of the case other than the insert is a non-neutral color.

5. The case for a mobile device as recited in claim 1; wherein the aperture-facing surface of said insert is sloped inward with respect to an axis of the aperture.

6. The case for a mobile device as recited in claim 5; wherein the aperture-facing surface of said insert is sloped inward to redirect light emitted by the flash unit of the mobile device outside a field of view of the camera of the mobile device.

7. The case for a mobile device as recited in claim 5; wherein the aperture-facing surface of said insert is sloped inward with respect to the axis of the aperture at an angle which is greater than an angle of a main cone of light emitted by the flash unit of the mobile device with respect to the axis of the aperture when the mobile device is arranged in the case.

8. The case for a mobile device as recited in claim 5; wherein the aperture-facing surface of said insert is sloped inward with respect to the axis of the aperture at an angle which is less than an angle of a secondary cone of light emitted by the flash unit of the mobile device with respect to the axis of the aperture when the mobile device is arranged in the case.

9. A case for a mobile device, the mobile device including a camera, said case comprising:
   a jacket which is separate and removable from the mobile device, and which is configured to cover a portion of an outer surface of said mobile device when the mobile device is arranged in the case;
   an opening in the jacket; and
   an insert which is arranged in the opening and comprises:
      an aperture; and
      an aperture-facing surface which faces the aperture;
   wherein the insert is configured to surround both a flash unit and a camera lens, the camera lens spaced separate from the flash unit, of the mobile device so that the flash unit and the camera lens are both exposed by said aperture of said insert when the mobile device is arranged in the case; and
   wherein a color of the aperture-facing surface of said insert is a predominantly neutral color, in terms of reflection of light emitted by the flash unit of said mobile device when the mobile device is arranged in the case.

10. The case for a mobile device as recited in claim 9; wherein said neutral color is black.

11. The case for a mobile device as recited in claim 9; wherein said neutral color is gray.

12. The case for a mobile device as recited in claim 9; wherein said neutral color is in gray scale.

13. The case for a mobile device as recited in claim 9; wherein the aperture-facing surface of said insert is absorptive, in terms of reflection of light.

14. The case for a mobile device as recited in claim 9; wherein the aperture-facing surface of said insert is flat.

15. The case for a mobile device as recited in claim 9; wherein the aperture-facing surface of said insert is concave.

16. The case for a mobile device as recited in claim 9; wherein the aperture-facing surface of said insert is convex.

17. The case for a mobile device as recited in claim 9; wherein the aperture-facing surface of said insert is multi-layered.

18. The case for a mobile device as recited in claim 9; wherein the aperture-facing surface of said insert is coarse or rough.

19. The case for a mobile device as recited in claim 9; wherein said mobile device further comprises a phone set.

20. The case for a mobile device as recited in claim 9; wherein said insert is a coating, film, or paint layer or layers.

21. The case for a mobile device as recited in claim 9; wherein the jacket comprises at least two layers.

22. The case for a mobile device as recited in claim 9; wherein a portion of the case other than the insert is a non-neutral color.

23. The case for a mobile device as recited in claim 9; wherein the aperture-facing surface of said insert is sloped inward with respect to an axis of the aperture.

24. The case for a mobile device as recited in claim 23; wherein the aperture-facing surface of said insert is sloped inward to redirect light emitted by the flash unit of the mobile device outside a field of view of the camera of the mobile device.

25. The case for a mobile device as recited in claim 23; wherein the aperture-facing surface of said insert is sloped inward with respect to the axis of the aperture at an angle which is greater than an angle of a main cone of light emitted by the flash unit of the mobile device with respect to the axis of the aperture when the mobile device is arranged in the case.

26. The case for a mobile device as recited in claim 23; wherein the aperture-facing surface of said insert is sloped inward with respect to the axis of the aperture at an angle which is less than an angle of a secondary cone of light emitted by the flash unit of the mobile device with respect to the axis of the aperture when the mobile device is arranged in the case.

27. A case for a mobile device, the mobile device including a camera, said case comprising:
a jacket which is separate and removable from the mobile device, and which is configured to cover a portion of an outer surface of said mobile device when the mobile device is arranged in the case;
an opening in the jacket; and
an insert which is arranged in the opening and comprises:
an aperture; and
an aperture-facing surface which faces the aperture;
wherein the insert is configured to surround both a flash unit and a camera lens, the camera lens spaced separate from the flash unit, of the mobile device so that the flash unit and the camera lens are both exposed by the aperture of said insert when the mobile device is arranged in the case; and
wherein the aperture-facing surface of said insert is absorptive, in terms of reflection of light emitted by the flash unit of said mobile device when the mobile device is arranged in the case.

28. The case for a mobile device as recited in claim 27; wherein said insert is a coating, film, or paint layer or layers.

29. The case for a mobile device as recited in claim 27; wherein the jacket comprises at least two layers.

30. The case for a mobile device as recited in claim 27; wherein a portion of the case other than the insert is a non-neutral color.

31. The case for a mobile device as recited in claim 27; wherein the aperture-facing surface of said insert is sloped inward with respect to an axis of the aperture.

32. The case for a mobile device as recited in claim 31; wherein the aperture-facing surface of said insert is sloped inward to redirect light emitted by the flash unit of the mobile device outside a field of view of the camera of the mobile device.

33. The case for a mobile device as recited in claim 31; wherein the aperture-facing surface of said insert is sloped inward with respect to the axis of the aperture at an angle which is greater than an angle of a main cone of light emitted by the flash unit of the mobile device with respect to the axis of the aperture when the mobile device is arranged in the case.

34. The case for a mobile device as recited in claim 31; wherein the aperture-facing surface of said insert is sloped inward with respect to the axis of the aperture at an angle which is less than an angle of a secondary cone of light emitted by the flash unit of the mobile device with respect to the axis of the aperture when the mobile device is arranged in the case.

35. A case for a mobile device, the mobile device including a camera, the case comprising:
a jacket which is separate and removable from the mobile device, and which is configured to cover a portion of an outer surface of the mobile device when the mobile device is arranged in the case;
an opening; and
an insert which is arranged in the opening and comprises:
an aperture;
an aperture-facing surface which faces the aperture;
wherein the insert is configured to surround both a flash unit and a camera lens, the camera lens spaced separate from the flash unit, of the mobile device so that the flash unit and the camera lens are both exposed by the aperture of said insert when the mobile device is arranged in the case; and
wherein the aperture-facing surface of the insert is sloped, concave, or convex so that light emitted by the flash unit of the mobile device strikes the aperture-facing surface and is reflected outside a capture area of the camera lens of the mobile device.

* * * * *